United States Patent [19]

Fain

[11] Patent Number: 4,989,275
[45] Date of Patent: Feb. 5, 1991

[54] FLUSHABLE VEHICLE SPITTOON

[76] Inventor: Dan L. Fain, Rte. 1, Box 82, Chancellor, Ala. 36316

[21] Appl. No.: 849,304

[22] Filed: Apr. 8, 1986

[51] Int. Cl.$^5$ .............................................. A61J 19/04
[52] U.S. Cl. ......................................................... 4/262
[58] Field of Search .................... 4/258, 259, 261, 262, 4/265, 266, 263, 264; 131/256

[56] References Cited

U.S. PATENT DOCUMENTS

| | | | |
|---|---|---|---|
| 1,679,715 | 8/1928 | Fish | 4/258 X |
| 1,733,995 | 10/1929 | Laverty | 4/266 |
| 2,754,145 | 7/1956 | Mackey | 4/262 X |
| 4,218,787 | 8/1980 | Puckett | 4/258 |

Primary Examiner—Charles E. Phillips
Attorney, Agent, or Firm—Fleit, Jacobson, Cohn, Price, Holman & Stern

[57] ABSTRACT

An upwardly opening receptacle is provided including lower closure structure defining a central gravity flow outlet. A flexible drain tube includes an inlet end operatively associated with the outlet for receiving liquid therefrom and an outlet end. Structure is provided for removably mounting the receptacle in stationary position within a motor vehicle and the outlet end of the drain tube is routed through the vehicle body portion for discharging liquid drained from the receptacle onto the ground beneath the vehicle. A spray jet is operatively associated with the vehicle for discharging a spray discharge of flushing liquid into the receptacle and liquid delivery structure is operatively associated with the spray jet for supplying liquid thereto under pressure from a liquid reservoir supported from the vehicle. In a first form of the invention the liquid reservoir comprises a conventional windshield washing liquid reservoir and a second form of the invention incorporates a separate flushing liquid reservoir for the receptacle, only. In addition, the liquid delivery structure may incorporate either an electrically driven pump or a manually operable pump for pumping liquid from the associated reservoir to the receptacle.

11 Claims, 3 Drawing Sheets

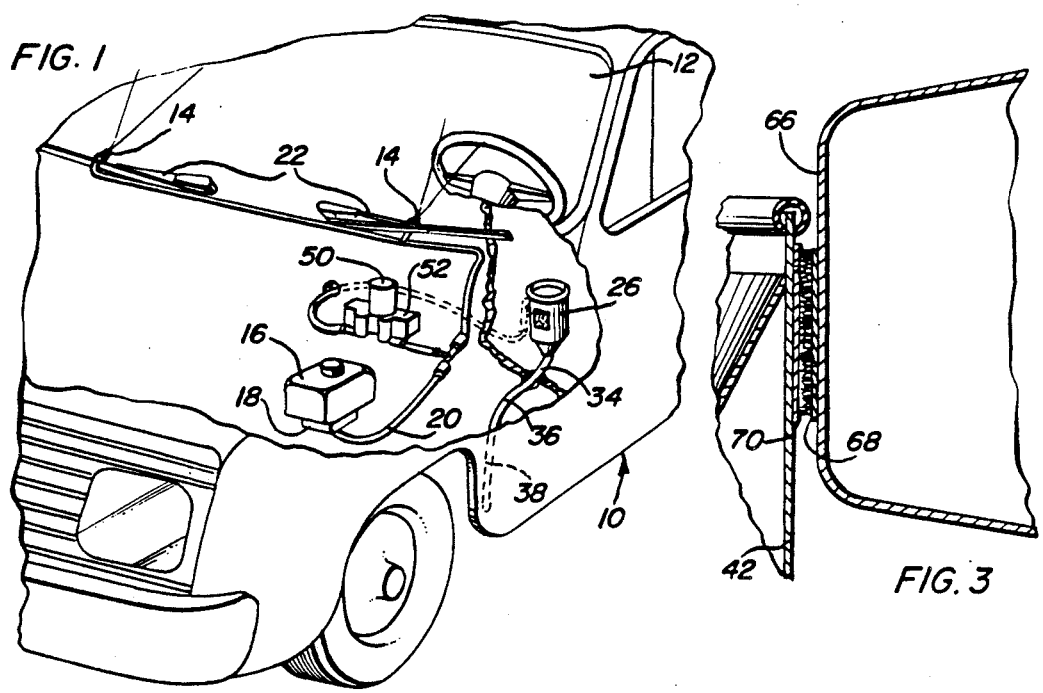
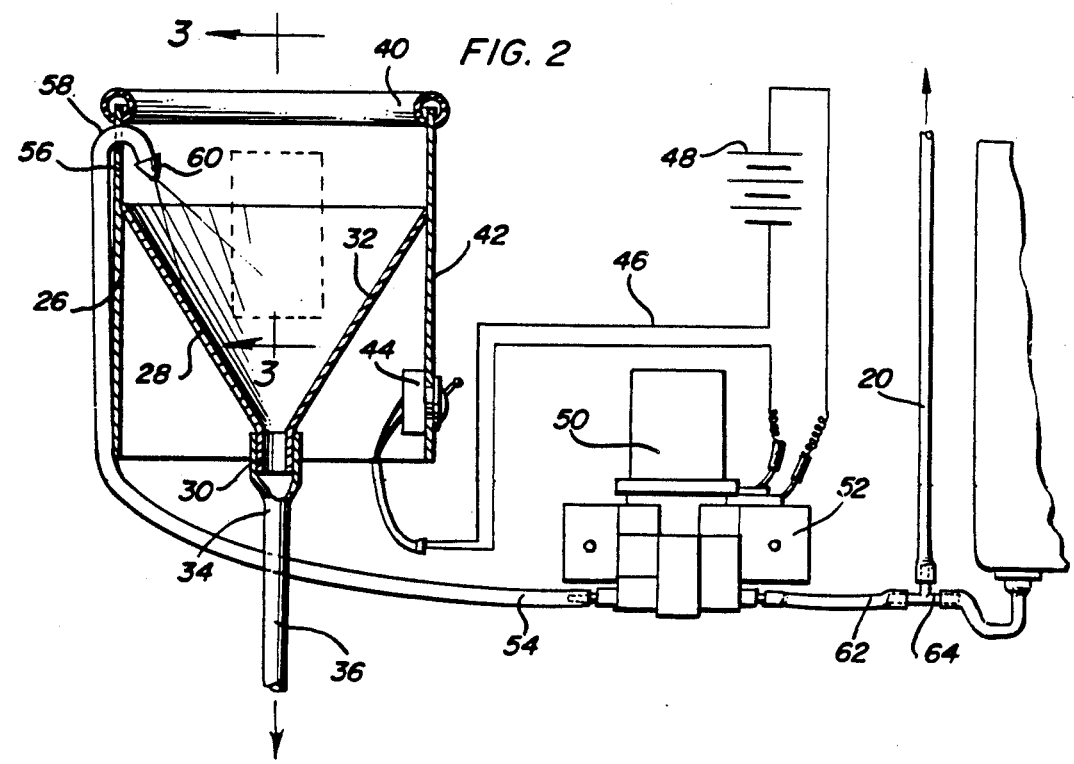

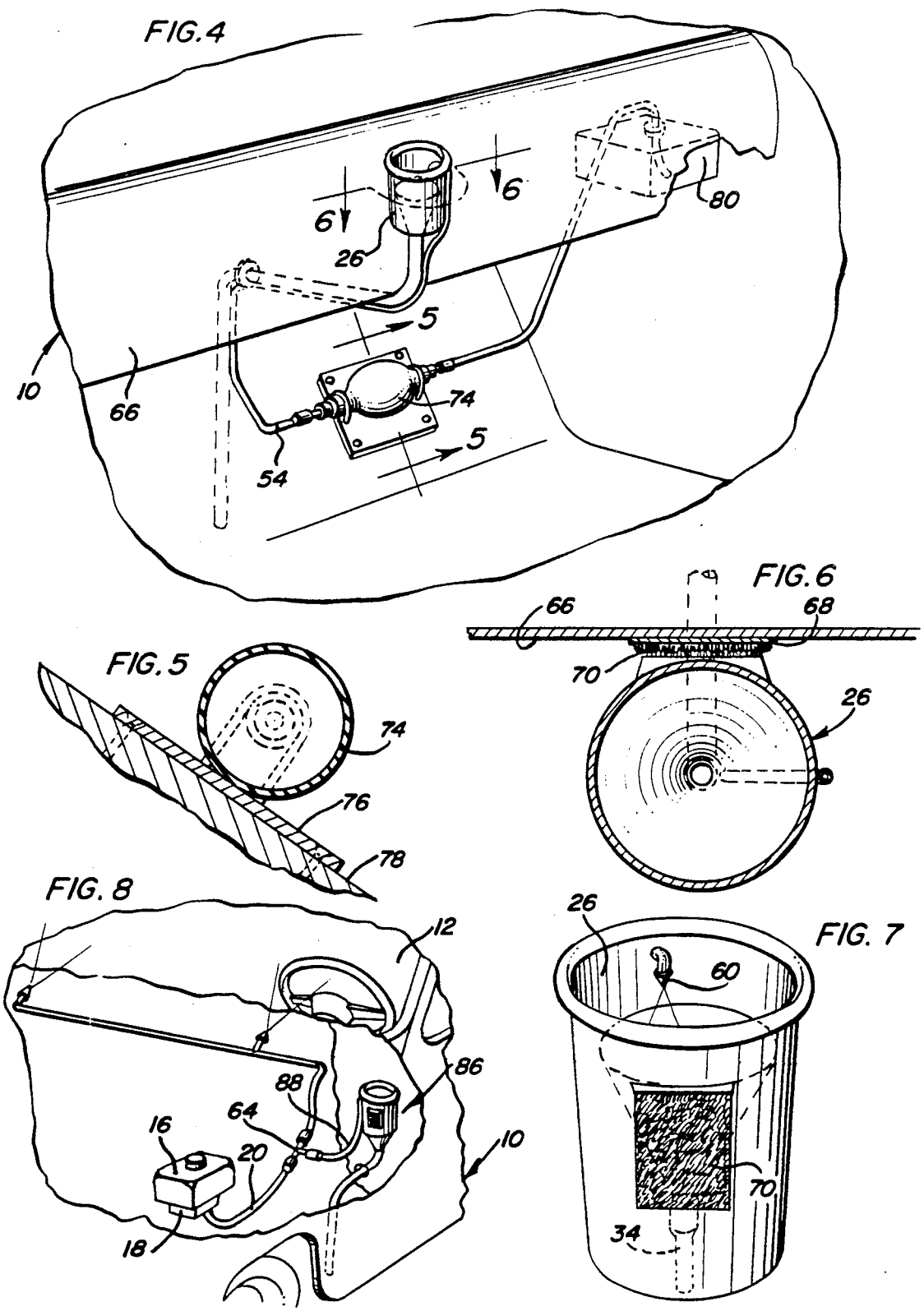

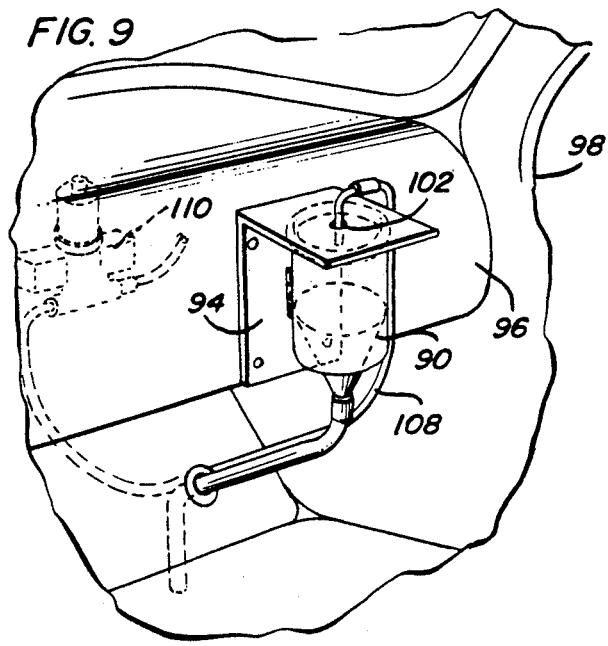
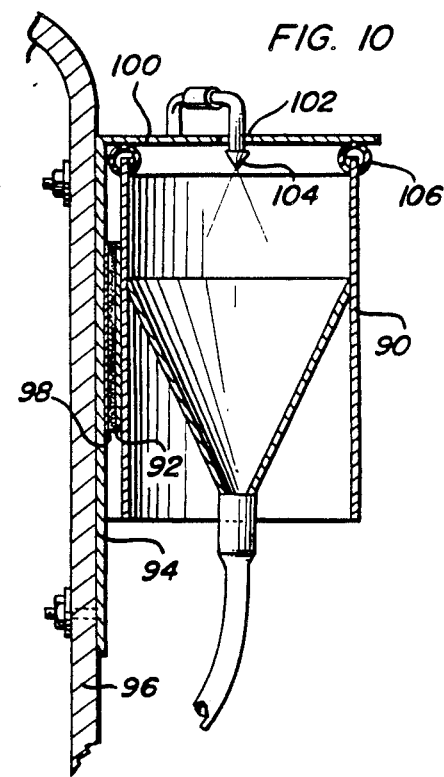
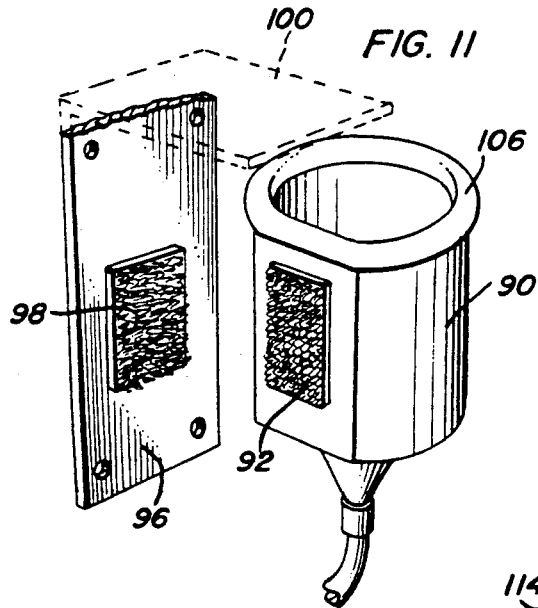
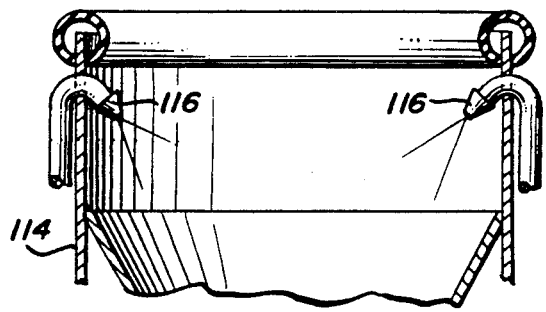

FLUSHABLE VEHICLE SPITTOON

BACKGROUND OF THE INVENTION

1. Field of the Invention

This invention relates to a receptacle to be removably stationarily mounted within the passenger or driver compartment of a motor vehicle and includes a bottom inclined downwardly toward a drain outlet with which the inlet end of a flexible drain line is operatively connected. The discharge end of the drain line opens outwardly from the vehicle compartment for discharging upon the ground and the receptacle is operatively associated with a flushing liquid reservoir (which reservoir may comprise the windshield washing fluid reservoir of an associated vehicle) for receiving washing liquid from the reservoir for the purpose of flushing the interior of the receptacle. The receptacle is to be used to receive sputum.

2. Description of Related Art

Various different forms of sputum receptacles heretofore have been provided as well as waste receptacles provided with flushing liquid dispensing structures. However, the instant invention incorporates a sputum receptacle for use in the interior of a motor vehicle compartment and equipped with a flexible drain line opening outwardly of the vehicle compartment for discharging upon the ground. A plurality of the disclosed forms of the sputum receptacles are operatively associated with a vehicle windshield washing liquid reservoir for receiving liquid therefrom under pressure to flush the receptacle after each usage thereof.

SUMMARY OF THE INVENTION

The spittoon of the instant invention incorporates an upwardly opening receptacle including a bottom which is inclined downwardly toward a centrally located gravity flow outlet and the inlet end of a flexible drain tube is operatively associated with the receptacle outlet. The drain tube opens outwardly of the associated vehicle compartment for discharging liquids flowing therethrough upon the ground beneath the vehicle and flushing liquid delivery structure is operatively associated with the receptacle for supplying flushing liquid thereto under pressure.

In a first form of the invention the flushing liquid delivery structure is operatively associated with a windshield washing liquid supply system of the associated vehicle downstream from the pump thereof whereby operation of the windshield washer pump will supply windshield washer liquid not only to the windshield washing liquid spray jets but also to the sputum receptacle for flushing the same.

In a second form of the invention also operatively associated with a windshield flushing or washing liquid delivery structure a selectively operable supplemental pump is incorporated whereby windshield washing liquid may be pumped from the windshield washing liquid reservoir to the receptacle independent of windshield washing liquid being pumped from the reservoir to the windshield washer spray jets.

In addition, a third disclosed form of the invention incorporates a separate flushing liquid reservoir and a manually operable pump for pumping liquid from the separate flushing liquid reservoir to the receptacle. The supplemental pump above referred to may comprise an electrically actuated pump or a manual pump and the separate flushing liquid reservoir also may use an electrically actuatable pump in lieu of a manually operable pump.

Various coacting support structures are provided for the receptacle and the interior of the associated vehicle whereby the receptacle may be readily removably supported in predetermined position within the vehicle. In a plurality of the disclosed forms, the receptacle itself includes one or more flushing liquid outlets for flushing the interior of the receptacle to which flushing liquid is supplied from the associated reservoir. On the other hand, one disclosed form of the invention utilizes a support for the receptacle relative to which the receptacle is removably supported and the support includes a spray jet outlet structure to which flushing liquid is supplied from the associated reservoir. The receptacle may be supported in adjusted vertical position relative to the support and the spray jet outlet structure faces in a vertical downward direction.

The main object of this invention is to provide a sputum receptacle for use in a motor vehicle or the like and having receptacle flushing structure operatively associated therewith whereby the receptacle may be flushed after each usage.

Another object of this invention is to provide a sputum receptacle in accordance with the preceding object and including a gravity drain outlet therefor operative to gravity drain sputum and flushing liquid therefrom in a downward direction from a location beneath the associated vehicle.

Another important object of this invention is to provide a sputum receptacle for use in a motor vehicle and operatively associated with the windshield washing liquid reservoir of the vehicle in a manner such that windshield washing liquid from the reservoir may be utilized to flush the sputum receptacle.

A final object of this invention to be specifically enumerated herein is to provide a sputum receptacle for use in a motor vehicle constructed in accordance with the preceding objects and which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary schematic view of the front lefthand portion of a motor vehicle illustrating a first form of spittoon constructed in accordance with the present invention operatively associated with the windshield washing system of the vehicle, portions of the vehicle body being broken away;

FIG. 2 is an enlarged fragmentary elevational view of the flushable spittoon illustrated in FIG. 1 with the receptacle portion of the spittoon being illustrated in vertical section;

FIG. 3 is a fragmentary vertical sectional view taken substantially upon the plane indicated by the section line 3—3 of FIG. 2;

FIG. 4 is a fragmentary perspective view of the interior of a conventional motor vehicle illustrating a second form of flushable spittoon mounted within the vehicle and incorporating a manually actuatable pump operatively associated with a supplemental or separate flushing liquid reservoir;

FIG. 5 is an enlarged fragmentary vertical sectional view taken substantially upon the plane indicated by the section line 5—5 in FIG. 4;

FIG. 6 is a fragmentary horizontal sectional view taken substantially upon the plane indicated by the section line 6—6 of FIG. 4;

FIG. 7 is a perspective view of the receptacle portion of the spittoon illustrated in FIGS. 4, 5 and 6;

FIG. 8 is a fragmentary perspective schematic view illustrating another form of spittoon constructed in accordance with the present invention utilizing only the conventional windshield washer liquid pump to simultaneously supply windshield washing liquid to windshield washing liquid spray jets and the spittoon receptacle for flushing the same;

FIG. 9 is a fragmentary schematic perspective view illustrating yet another form of the instant invention wherein a support is mounted within the vehicle for ready removable support of the receptacle therefrom and wherein the support itself stationarily mounts a downwardly opening spray jet for spray discharging flushing liquid into the receptacle portion of the spittoon disposed therebelow;

FIG. 10 is an enlarged vertical sectional view taken substantially upon the plane indicated by the section line 10—10 of FIG. 9;

FIG. 11 is an exploded perspective view of the assembly illustrated in FIG. 10 with the upper horizontal flange of the receptacle support and the attendant spray discharge jet removed; and FIG. 12 is an enlarged fragmentary vertical sectional view of yet another form of receptacle incorporating a pair of flushing liquid spray discharge jets.

DESCRIPTION OF THE PREFERRED EMBODIMENTS

Referring now more specifically to the drawings the numeral 10 generally designates a conventional form of passenger motor vehicle including a windshield 12 with which a pair of spray jets 14 are operatively associated for spraying windshield washing liquid upon the windshield 12. The vehicle 10 includes a windshield washer fluid reservoir 16 having a remotely actuatable electric motor driven pump assembly 18 operatively associated therewith and the pump assembly 18 is communicated with the spray jets 14 by a liquid delivery line 20. The pump assembly is of the conventional type and is remotely operable from the interior of the driver's compartment of the vehicle 10 by manual operation of a switch (not shown) operatively associated with the windshield wiper mechanism of which the windshield wiper arm and blade assemblies 14 comprise parts. Actuation of the pump assembly 18 causes washer liquid to be pumped from the reservoir 16 to the spray jets 14.

In a first form of the instant invention a flushable spittoon is provided and comprises an upwardly opening cylindrical receptacle 26 incorporating a lower wall or closure structure 28 having a downwardly opening outlet 30. The closure structure 28 defines upwardly facing closure surfaces 32 which are inclined downwardly toward the outlet 30.

The outlet 30 has the inlet end 34 of a flexible drain line 36 operatively associated therewith for receiving liquid draining from the receptacle 26 and the drain line 36 includes an outlet end 38 for discharging the liquid drained from the receptacle 26 downwardly onto the ground beneath the vehicle 10. The receptacle 26 additionally includes an upper marginal portion about which a resilient trim bead 40 extends and the receptacle 26 further includes a depending skirt portion 42, see FIG. 2, from which an on-off toggle switch 44 is supported. The toggle switch 44 is serially connected in a loop-type electrical circuit 46 electrically connecting the battery 48 of the vehicle 10 with the electric motor 50 of a supplemental pump 52 serially disposed within a delivery hose 54 opening inwardly through an upper wall portion 56 of the receptacle 26 at its outlet end 58 and supporting a spray jet nozzle 60 therefrom. The inlet end 62 of the hose 54 is operatively communicated with the liquid delivery line 20 through the utilization of a T fitting 64. Accordingly, upon operation of the pump assembly 18 washing liquid will be pumped from the reservoir 16 to the spray jets 14 for washing windshield 12. However, upon operation of the supplemental pump 52, washing liquid will be pumped from the reservoir 16 to the spray jet nozzle 60 for flushing the interior of the receptacle 26.

From FIG. 3 of the drawings it may be seen that the dashboard 66 of the vehicle 10 includes a first thistle-type fastener pad 68 supported therefrom and that one side of the skirt portion 42 has a second thistletype fastener pad 70 supported therefrom. The pad 70 is releasably engageable with the pad 68 for removably supporting the receptacle 26 from the dashboard 66.

With attention now invited more specifically to FIG. 4 of the drawings, there may be seen a second form of spittoon also incorporating a receptacle 26, but which does not include the toggle switch 44. Rather, the hose 54 of the second form of spittoon illustrated in FIG. 4 has a manually operable bulb-type pump 74 serially connected therein in lieu of the supplemental pump 52. The pump 74 may include a mounting base 76 anchored relative to the floor 78 of the interior of the vehicle 10 and the inlet end of the hose 54 may open into a supplemental reservoir 80 for containing flushing liquid other than windshield washing liquid. Accordingly, in that form of the invention illustrated in FIG. 4, the receptacle 26 is not reliant upon the windshield washer system of the vehicle 10 for supplying flushing liquid to the receptacle 26. Rather, the receptacle 26 in FIG. 4 is operatively associated with its own reservoir 80 of flushing liquid.

As may be seen from FIG. 6, the receptacle 26 in FIG. 4 also includes pads 68 and 70 for removably supporting the receptacle 26 from the dashboard 66 of the vehicle 10.

With attention now invited more specifically to FIG. 8, there may be seen a third form of receptacle referred to in general by the reference numeral 86 and which is mounted within the vehicle 10 in substantially the same manner as that illustrated in FIG. 1. However, the receptacle 86 is supplied flushing liquid through a hose 88 corresponding to the hose 54 communicated with the liquid delivery line 20 through a T fitting 64, but the hose 88 does not have a supplemental pump such as supplemental pump 52 serially connected therein. Of course, the receptacle 86 is more like the receptacle 26 of FIG. 4 than the receptacle 26 of FIG. 2 in that the receptacle 86 does not include a toggle switch corresponding to switch 44. Rather, any time the pump assembly 18 of that form of the invention illustrated in FIG. 8 is actuated to spray discharge windshield cleaning liquid upon the windshield 12, windshield washing liquid is also supplied to the receptacle 86 for flushing the same.

Of course, if it is desired, the manual pump 74 of FIG. 4 may be serially connected in the hose 88 of FIG. 8. In addition, an electrically actuatable supplemental pump such as supplemental pump 52 may be substituted for the manual pump 74 of FIG. 4.

With attention now invited more specifically to FIGS. 9, 10 and 11, there will be seen a receptacle 90 corresponding to the receptacle 26 in FIGS. 6 and 7, but which does not include a spray jet nozzle 60 supported therefrom. Rather, the receptacle 90 includes a thistle-type fastening pad 92 supported therefrom corresponding to the pad 70 and the receptacle 90 is utilized in conjunction with a mounting bracket 94 mounted upon the dashboard 96 of a vehicle 98. The mounting bracket 94 includes a thistle-type fastening pad 98 corresponding to the pad 68 and the pads 92 and 98 enable the receptacle 90 to be supported from the mounting bracket 94. The mounting bracket 94, however, includes an upper horizontal flange 100 supported therefrom and having a central opening 102 formed therein in vertical alignment with the receptacle 90 when the latter is supported from the pad 98. In addition, a spray jet nozzle 104 is stationarily mounted relative to the bracket 94 in any desired manner (not shown) and projects downwardly through the opening 102 and is oriented to discharge a spray jet of flushing liquid therefrom in a vertical downward direction. The receptacle 90 may be supported from the mounting bracket 94 with the trim bead 106 of the receptacle 90 abutted up against the underside of the horizontal flange 100, or spaced slightly therebelow. The spray jet nozzle 104 is supplied flushing liquid under pressure through a hose 108 corresponding to the hose 54 from a pump 110 corresponding to the pump 52. The pump 110 may be operatively associated with a reservoir such as the reservoir 16, or a reservoir such as the reservoir 80. In addition, in lieu of the pump 110, a pump corresponding to the manually actuatable 74 may be used. In any event, the spray jet nozzle 104 is operative to discharge a receptacle flushing spray jet of liquid down into the receptacle 90 for flushing the same.

FIG. 12 illustrates a receptacle 114 corresponding to the receptacle 26 illustrated in FIGS. 4, 6 and 7, but which includes a pair of spray jet nozzles 116 corresponding to the spray jet nozzle 60. Of course, the spray jet nozzles 116 are communicated with the same source (not shown) of flushing liquid such as a reservoir 16 or the reservoir 80.

Further, flushing liquid may be supplied under pressure to the nozzles 116 through an electrically actuated pump such as pump 52 or a manually operated pump such as pump 74.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a motor vehicle including a passenger compartment having a stationary component therein, a flushing liquid reservoir, a flushable spittoon, said spittoon including an upwardly opening receptacle incorporating a lower closure structure defining a gravity-type drain outlet opening therethrough toward which at least major portions of the upper surface of said lower closure structure are downwardly inclined, said receptacle and component including coacting support means supporting said receptacle in predetermined stationary position from said component within said compartment for ready manual release of said receptacle from said component and also subsequent ready re-support of said receptacle from said component through usage of single arms and hand movements independent of the use of tools, a flexible tubular drain line having one end operatively connected to said drain outlet for receiving liquid draining from said receptacle through said outlet, and flushing liquid delivery means operatively associated with said receptacle and reservoir for selectively pressure discharging flushing liquid from said reservoir into said receptacle, said coacting support means and flexible tubular drain line enabling single handed manual release of said receptacle from said component, manual displacement of the receptacle from an area adjacent said component to an area adjacent the head of the operator of the vehicle and subsequent manual return of the receptacle to said area adjacent said component and re-support of said receptacle from said component without requiring direct vision on the part of the operator of the vehicle.

2. The motor vehicle and spittoon combination of claim 1 wherein said flushing liquid reservoir includes a windshield washing fluid reservoir and said vehicle includes a windshield and spray jet means for spray discharging washing liquid on said windshield, said liquid delivery means incorporating selectively operable pump means operatively associated with said spray jet means and receptacle for simultaneously supplying washer liquid under pressure from said reservoir to said spray jet means and receptacle.

3. The motor vehicle and spittoon combination of claim 1 wherein said flushing liquid reservoir includes a windshield washing liquid reservoir and said vehicle includes a windshield and spray jet means for spray discharging washing liquid on said windshield, said liquid delivery means incorporating selectively operable first pump means for supplying washing liquid from said reservoir to said spray jet means and selectively operable second pump means for supplying washing liquid from said reservoir to said receptacle.

4. The combination of claim 3 wherein said first and second pump means each comprise electric motor driven pumps.

5. The combination of claim 3 wherein said first pump means comprises an electric driven motor pump and said second pump means comprises a manually operable pump.

6. The motor vehicle and spittoon combination of claim 1 wherein said flushing liquid delivery means includes means operative to pressure discharge liquid from said reservoir only into said receptacle.

7. The motor vehicle and spittoon combination of claim 1 wherein said flushing liquid delivery means includes a downwardly directed spray jet stationarily mounted relative to said vehicle and said coacting support means includes means operative to removably support said receptacle from said vehicle beneath and in vertical registry with said downwardly directed spray jet.

8. The combination of claim 7 wherein said coacting support means includes means operative to removably support said receptacle in said vehicle in at least slightly vertically shifted positions relative to said vehicle.

9. The combination of claim 8 wherein said coacting support means includes a first form of thistle-type fastener pad supported from said vehicle and a second form of thistle-type fastener pad supported from said receptacle, said first and second types of pads being removably engagable with each other.

10. The motor vehicle and spittoon combination of claim 1 wherein said flushing liquid delivery means includes means for discharging a single spray of flushing liquid into said receptacle.

11. The motor vehicle and spittoon combination of claim 1 wherein said flushing liquid delivery means includes means operative to spray discharge a plurality of jets of flushing liquid into said receptacle.

* * * * *